UNITED STATES PATENT OFFICE.

CHARLES S. LOCKWOOD, OF ALBANY, NEW YORK, ASSIGNOR TO THE BONSILATE COMPANY, (LIMITED,) OF SAME PLACE.

PROCESS OF TREATING ALKALINE SILICATES.

SPECIFICATION forming part of Letters Patent No. 317,389, dated May 5, 1885.

Application filed August 13, 1884. (No specimens.)

*To all whom it may concern:*

Be it known that I, CHARLES S. LOCKWOOD, a citizen of the United States, and a resident of Albany, in the county of Albany and State of New York, have invented certain new and useful Improvements in Processes of Treating Alkaline Silicates, of which the following is a specification.

My invention relates to an improved process of treating alkaline silicates.

In an application made by John W. Hyatt and myself a process is described, whereby an alkaline silicate is so treated as to be subjected with success to the action of heated molds. In the said application it is set forth that an alkaline silicate when properly desiccated and comminuted may be successfully molded, and the article formed by molding or otherwise treated so as to be enhanced in value.

The present invention has relation to an improvement upon the process described in the said application, and is based upon the discovery that turpentine or its equivalent with or without camphor may be used with good results, as hereinafter described. In practice I take any alkaline silicate, selecting by preference one having a minimum quantity of alkali. The silicate being in solution, I add a quantity of water, and after filtering the solution reduce it to such an extent that at a temperature of 60° it has a specific gravity of about 26° Baumé. Of the solution just described I take, say, eight pounds, and, if desired, add, say, two pounds of any suitable oxide or inert material, the purpose in adding the oxide or inert material being to give color, weight, or finish to the article.

Having prepared a solution consisting of turpentine and camphor in the proportion of, say, six parts of turpentine to two parts of camphor, I take of such solution, where the quantities of silicate and oxide just referred to are used, say, ten ounces, which is added to the first-mentioned solution. The ingredients aforesaid, having been brought together in the proportions specified, are thoroughly mixed in any convenient way, after which the compound is placed by preference on a water bath and the aqueous particles evaporated until they have been so far removed as to allow the material to be readily comminuted. Before the comminution is attempted the compound will, by preference, be allowed to become cool, when it will be subjected to the action of a mill of any convenient kind, or otherwise treated so as to be reduced to a very fine powder, after which it will be ready to be subjected to the action of the molds; but to insure a good result it will be necessary to ascertain whether or not the compound is in the right condition for molding. This may be determined by placing it in an evaporating-pan and stirring it continuously until it is in a condition in which it will not adhere to a piece of polished metal under, say, 300° Fahrenheit of heat and a pressure of, say, eight thousand pounds to the square inch. If the powder does not attach itself to the polished surface of heated metal and will weld together, it is in a proper condition to be introduced into the molds. The dies employed will be of usual construction and heated to a temperature of, say, from about 200° to 300° Fahrenheit, and the material will be subjected to a pressure of about, say, two thousand pounds to the square inch, more or less, according to the character of the article, the heat and pressure being continued until a complete solidification of the contents of the mold has been accomplished. The powder having been subjected to the action of the mold to form the article, it is immersed in a bath consisting, preferably, of chloride of ammonium, say, in the proportion of two parts of water to, say, one part of chloride of ammonium for from ten to fifteen hours, or until a test will show no further alkaline reaction. Upon the removal from the bath the article may be polished; or it may be polished before it is introduced into the bath.

It is important that great care be exercised in desiccating the material. The test we have hereinbefore mentioned we believe to be a safe one, which may be relied upon under ordinary conditions.

We prefer to use the ingredients hereinbefore described in the proportions specified, and to treat them in the manner we have set forth; but, as has been stated, the camphor, and also the oxide or other inert material, may be omitted and only the silicate and turpentine or its equivalent, made use of in the proportions hereinbefore specified, the process being substantially the same, except that the silicate and turpentine may be brought together in the manner hereinbefore described, or in other ways, if desired.

In specifying turpentine we have intended to give it only as an example, as other resinous substances having similar characteristics may be employed with substantially similar results. The bath, too, may be varied according to circumstances. Thus a bath consisting of sulphate of lime or chloride of lime may be used, the object being in all cases to correct the tendency of the material under certain conditions to attract moisture and to effloresce. The proportions which we have given are those which we prefer to make use of, although they may be varied to some extent.

What we claim as our invention, and desire to secure by Letters Patent, is—

1. The process herein described of treating an alkaline silicate, which consists in, first, forming a solution of the silicate; second, adding thereto a resinous material, and, third, comminuting the compound and subjecting it to heat and pressure, substantially as described.

2. The within-described process of treating an alkaline silicate, which consists in forming a solution, adding thereto a resinous material and camphor, and then desiccating, comminuting, and molding the compound, substantially as described.

3. The use of a resinous material for the purpose of facilitating the treatment of an alkaline silicate, substantially as described.

4. The use of a resinous material and camphor for the purpose of facilitating the treatment of an alkaline silicate, substantially as described.

Signed at Albany, in the county of Albany and State of New York, this 2d day of August, A. D. 1884.

CHAS. S. LOCKWOOD.

Witnesses:
ROBERT C. PRUYN,
E. A. GROESBECK.